June 3, 1924.

A. P. DAVIS 1,496,150

GYROSCOPIC COMPASS

Filed Oct. 1, 1921

Inventor
Arthur Pattison Davis
By his Attorneys
Mock & Blum

June 3, 1924.
A. P. DAVIS
1,496,150
GYROSCOPIC COMPASS
Filed Oct. 1, 1921
3 Sheets-Sheet 2
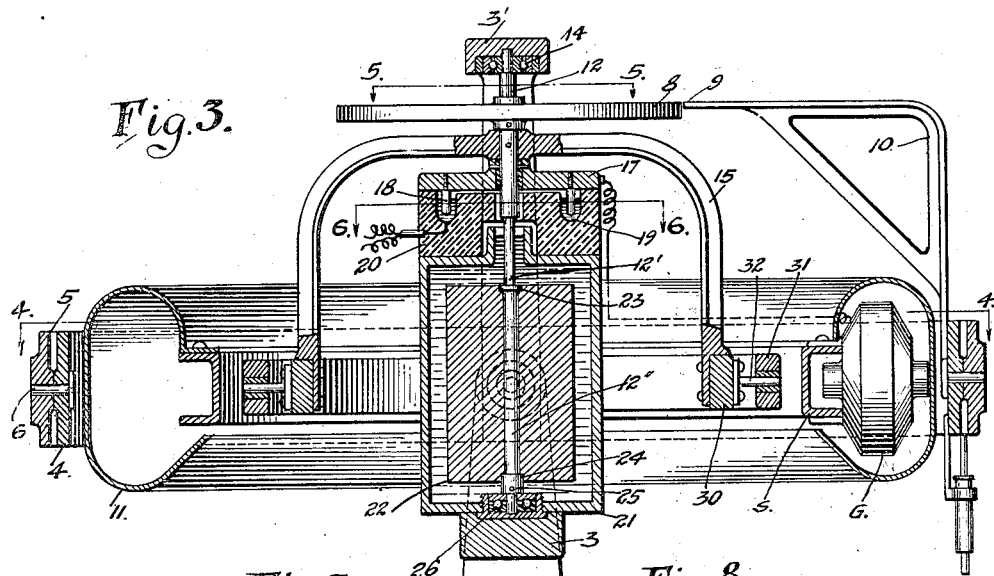
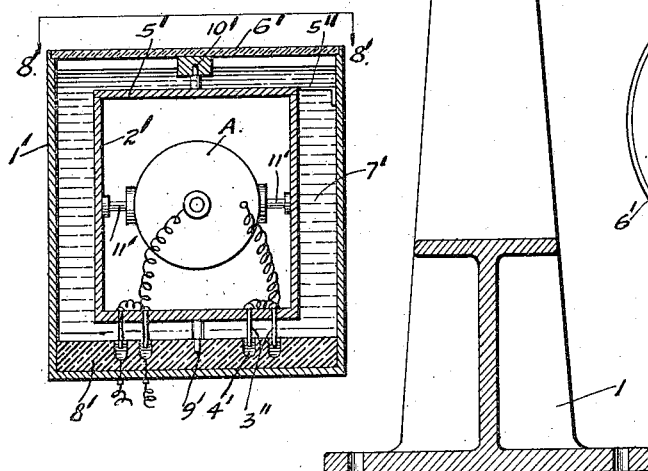
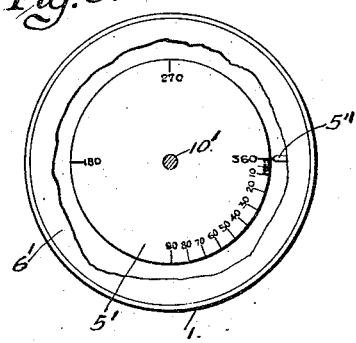
Inventor
Arthur Patten Davis
By his Attorneys
Mock & Blum

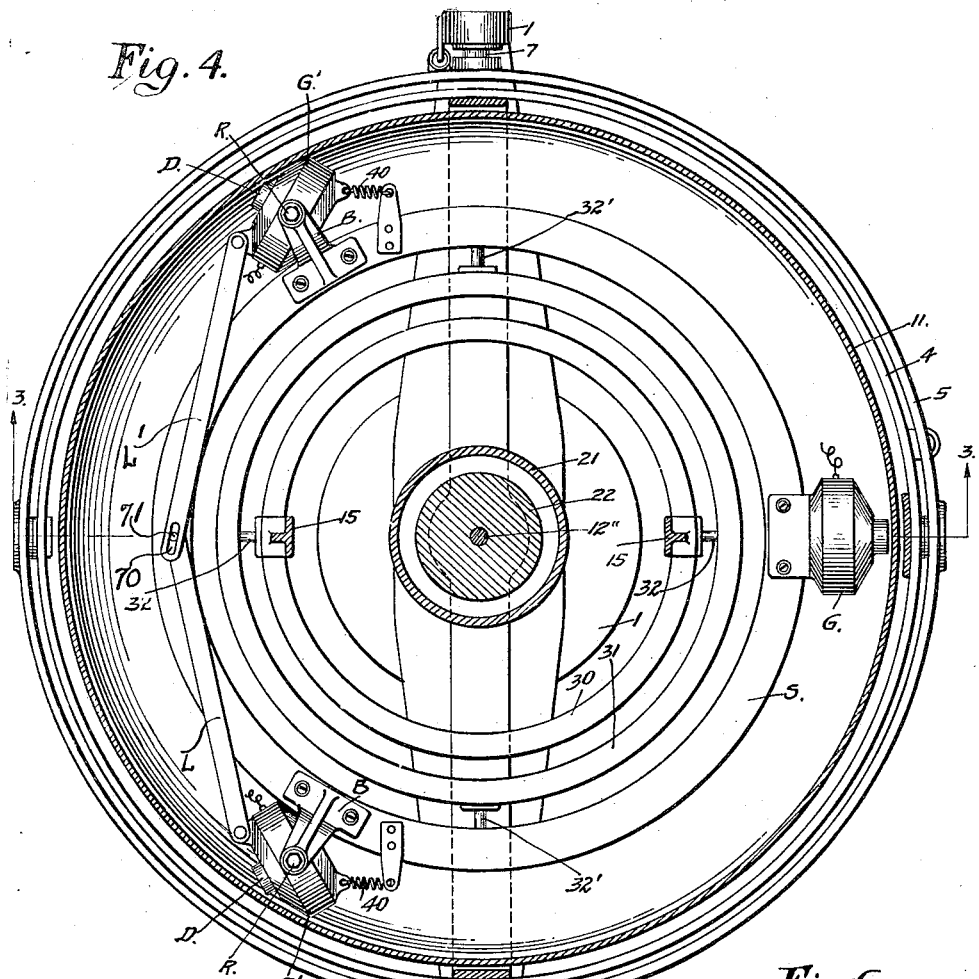
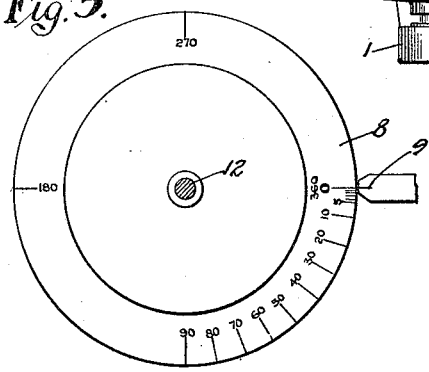
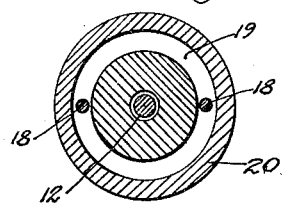

Patented June 3, 1924.

1,496,150

UNITED STATES PATENT OFFICE.

ARTHUR PATTISON DAVIS, OF NEW YORK, N. Y.

GYROSCOPIC COMPASS.

Application filed October 1, 1921. Serial No. 504,726.

*To all whom it may concern:*

Be it known that I, ARTHUR PATTISON DAVIS, a citizen of the United States, residing at 601 W. 115th St., borough of Manhattan, city, county, and State of New York, have invented certain new and useful Improvements in a Gyroscopic Compass, of which the following is a specification.

My invention relates to a new and improved form of gyroscopic compass.

It has been recognized for many years that the axis around which a gyroscopic compass turns in seeking the meridian should be so mounted that there should be substantially no force to hinder the said compass from pointing in the true north and south direction.

The directive force of a gyroscopic compass is at the best small with respect to its mass and this directive force becomes very small when the compass is pointing in a direction which is very close to the true one, and since only a small error is a very serious matter in navigation it is necessary to provide means for carrying or supporting the weight of the compass in such a manner that the directive force, no matter how small, can cause the compass to point in the true north and south direction.

It has heretofore been proposed to have a float partially immersed in a body of mercury carry the weight of the compass and this form of construction has many advantages, in that the weight of the compass can be neutralized by the upward force exerted upon the float, with great precision, and because this buoyancy effect is constant and is not affected by any external forces.

It has been found, however, that the film of mercury at the top of the pool in which the float is immersed, has an appreciable surface tension, especially if the mercury through exposure to dust, oil vapors, etc., has some impurities thereon, and this surface tension is sufficient to keep the compass from accurately assuming a position of rest so that it points in the true direction. It is well known that for a number of reasons such as a change in the ship's speed for instance, a gyroscopic compass oscillates through small angles quite frequently, and if there is a slight force tending to keep the compass from pointing in the true direction by a degree or the like, then this is sufficient to produce an appreciable error in the course of a day's run so that a compass having an error of this extent and nature would not be suitable for the purposes of the United States Navy.

According to my invention a new and improved construction is provided, so that the error, of the compass due to the surface tension of the mercury acting on the float is either entirely eliminated or is made too small to have any appreciable effect.

One object of my invention is to provide a compass with a vertical shaft having a portion thereof of reduced diameter, so that the surface tension or drag acts upon a shaft having a small diameter whereby its disturbing effect is minimized or eliminated altogether.

Other objects of my invention will be set forth in the following description and drawings which illustrate a preferred embodiment thereof and also a modification thereof.

Fig. 3 is a section on the line 3—3 of Fig. 4.

Fig. 4 is a section on 4—4 of Fig. 3.

Fig. 5 is a top view showing the mounting of the compass card, this view being on the line 5—5 of Fig. 3.

Fig. 6 is a section on the line 6—6 of Fig. 3.

Fig. 7 is a vertical sectional view illustrating a modification.

Fig. 8 is a view on the line 8—8' of Fig. 7.

The entire device rests upon a pedestal or mount 1, which can be secured to the deck of the ship or at any suitable point.

Figure 1:
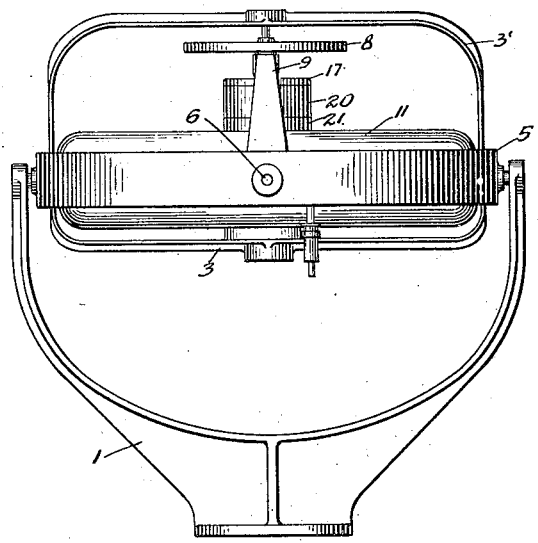
Fig. 1 is a front elevation.
Figure 2:
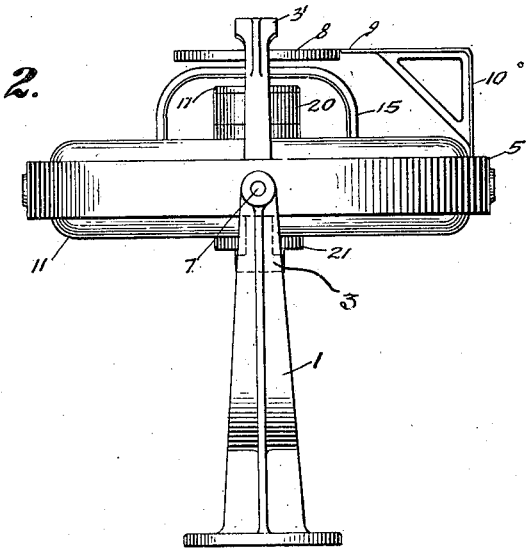
Fig. 2 is an end elevation.

As can be clearly seen in Figs. 1 and 2, bracket 3 is located adjacent the top of the pedestal 1.

A ring 4 is secured to the bracket 3 by any suitable means such as rivets or the like.

The ring 4 can freely swing with respect to the larger outside ring 5, as it is secured thereto by means of pivots 6, as is clearly shown in Fig. 3.

The larger outside ring 5, to which the smaller outside ring 4 is thus secured, can itself swing or oscillate with respect to the pedestal 1, by means of the pivots 7 which are clearly shown in Fig. 4. Hence the larger outside ring 5 swings on an axis which is parallel to the plane of the paper in Fig. 1 and the smaller outside ring 4 oscillates about an axis which is perpendicular to the plane of the paper in Fig. 1.

The indicator 9 for the compass ring 8 is secured to the smaller outside ring 4 by means of the bracket 10, as clearly shown in Fig. 3.

The two inner rings 30 and 31 to be later described, are substantially completely enclosed by means of a casing 11.

A top bracket 3' is secured to the ring 4 by means of rivets or any other suitable means, and hence, since both the top bracket 3' and the bottom bracket 3 are both secured to the ring 4, they form substantially a single bearing or support for the innermost rings 30 and 31.

As can be clearly seen in Fig. 3, for example, the supporting central shaft 12, is connected to the top bracket 3' by means of an anti-friction bearing 14 which may be of any suitable type. The shaft 12 has the compass card 8 secured thereto and it runs through and is also secured to a T-shaped bracket 15.

The shaft 12 also has a plate 17 secured thereto, so that they revolve in unison.

The plate 17 has pins 18 secured thereto, and these pins 18 dip into a mercury groove 19 for a purpose to be later described.

The mercury groove 19 is in a plate 20 which surrounds the shaft 12 but is free with respect thereto, so that the plate 20 remains stationary while the shaft 12 revolves.

The plate 20 is made of any suitable insulating material and is secured to the container 21 which has the mercury therein.

The portion 12' of the shaft 12 which passes through the top of the pool of mercury, is reduced in diameter as much as possible and is, for example, about half an inch in diameter in a compass of ordinary size.

It will also be noted that the container 21 has a neck of reduced diameter so that the surface of the mercury which is exposed to impurities is of minimum diameter and need not ordinarily be more than about ¾ inch in diameter.

The portion 12'' of the shaft 12 which is connected to the float 22, is provided with a collar 23 of greater diameter than the portion 12', and this collar 23 fits into a depression in the top wall of the float 22, so as to make a snug fit, and the float 22, together with the shaft 12, are connected to the lower part of the container 21 by means of a collar 24 which fits snugly into the wall of the float 22, and is secured to the shaft by means of a pin 25, the said connection being completed by means of an anti-friction bearing 26 of any well known type. This anti-friction bearing 26 is secured to the bracket 3, as is clearly shown in Fig. 3, and it projects within the container 21, fitting tightly therein.

Hence substantially the entire weight of the compass, including the weight of all the parts of the apparatus which are within the ring 4, is substantially neutralized or counterbalanced by the buoyancy of the float 22. The shaft 12 can move up and down slightly within the brackets 3 and 3', but it cannot move laterally being restrained by the said anti-friction bearings 14 and 26.

The smaller inner ring 30 is secured to the T-shaped bracket 15, as is clearly shown in Fig. 3. The larger inner ring 31 is connected to the smaller inner ring 30 and to ring S by means of revoluble members 32 and 32', as is clearly shown in Figs. 3 and 4, so that the supporting ring S can oscillate very freely around both axes with respect to the T-shaped bracket 15.

The three gyroscopic elements are secured to the supporting ring S. The gyroscope G is rigidly secured to the supporting ring S and the gyroscopes G' are pivotally secured at pivots R to brackets B which are rigidly secured to the supporting ring S. Hence the gyroscopes G' can revolve about the said pivots R a small amount so as to alter the inclinations of their axles D with respect to each other and with respect to the center of the gyroscope G.

Springs 40 normally hold the gyroscopes G' so that their axles will normally be in the position shown in Fig. 4 in which the axles of the gyroscopes G' if extended would intersect in the center of the gyroscope G. In other words, the normal position of the three gyroscopes, is a well known position heretofore used in compasses of the Anschutz type, in which the axes of revolution of the two gyroscopes G' intersect in the axis of revolution of the gyroscope G, the two axes of revolution of the gyroscopes G', normally making an angle of 60 degrees with each other.

The gyroscopes G' are rigidly secured to the links L and L' and as can be clearly seen in Fig. 4, the link L' has a slot 70 in which a pin 71 of the link L fits so that the movements of the gyroscopes G' from the normal position are uniform.

In a mechanical assemblage of this type, it is always possible for the supporting shaft of the compass to slightly become inclined to the vertical from several causes, as for instance, from expansion. Since the buoyancy of the float always exerts an upward force, if the shaft became inclined to the vertical, this upward force would produce a component at right angles to the direction of the shaft, and this would cause a frictional effect which creates errors.

By the use of the bracket 15 the center of mass of the gyroscopes and their various supporting rings is lowered to coincide with the center of buoyancy of the float 22. When this condition is obtained, the freedom of the floating system to turn is unaffected by a slight permanent inclination of the supporting shaft 12 and the instrument consequently retains its accuracy under conditions which would seriously handicap the ordinary arrangement.

It has hitherto been found impossible to prevent impurities, such as oil and the like, from collecting upon the top of the pool of mercury, especially after the compass had been in use for some time, but according to my invention the top of the pool is made of such small diameter, and the surface tension has such a small leverage because of the reduced diameter of the part 12' that this source of error is so minimized as to be substantially negligible.

As shown more particularly in Fig. 3, two leads are connected with the mercury groove 19, and such other connections as are necessary are provided for supplying electric current to the motors of the three gyroscopic elements G and G' but this in itself need not be further illustrated as any conventional and well known means may be employed. Supporting ring S is connected to ring 31 by knife edges 32'.

The improvement shown in Figs. 7 and 8 is intended to provide a compass which is somewhat less accurate, but which can be made much more cheaply and hence can be employed for use on commercial vessels for whom the high cost of complicated gyroscopes has hitherto been regarded as substantially prohibitive.

In the improvement shown in Fig. 7 the container 1' is filled with a liquid 7', which may be kerosene or some other fluid which can transmit light, in contradistinction to an opaque liquid like mercury. The container 1' has an index 5'' secured thereto and this co-operates with the compass card 5' which is at the top of the float 2'. The float 2' is restrained from any lateral movement by pivot projections 9' and 10'. The projection 9' fits into a plate 8' made of insulating material, and which is located at the bottom of the container 1'. The projection 10' fits into a bracket or projection of the transparent top 6' of the container 1'. The float 2' is hollow and has a single weighted gyroscopic element A mounted upon a shaft 11' in the usual and well known manner.

It will be noted that in this improvement the centre of mass of the gyroscope also substantially coincides with the centre of buoyancy for the purpose before mentioned. The electric motor for operating the gyroscope A communicates with the mercury grooves 4' by means of pins 3'' of the usual leads. Since an inclination of the whole instrument cannot exert any substantial frictional effect upon the revolution of the float, this gyroscope, although very cheap and simple, is substantially accurate for ordinary commercial purposes.

I have described preferred embodiments of my invention but it is clear that numerous changes and omissions can be made without departing from its spirit.

It will be noted that contrary to the practice which has existed heretofore, that the float is completely immersed instead of being partially immersed and that it is mounted upon a shaft which only has a movement of revolution about its longitudinal axis, while the container 21 is so connected to the pedestal 1, by means of the series of rings and connections before mentioned, that it has what is well known as the Cardan suspension.

It will be noted that the level of the kerosene or the like, in the apparatus shown in Fig. 7 is above the bottom of the bearing for member 10' so that the surface tension of the kerosene has no effect upon the revolution of the float. The important feature of my invention is that the surface tension of the supporting liquid in both embodiments of my invention, acts upon a surface whose diameter is less than the diameter of the supporting or buoying body.

I claim:—

1. A gyroscopic compass having a meridian seeking member whose weight is substantially counterbalanced by the buoyancy of a float immersed in a body of liquid, the said member and float forming a combined structure, a shaft connected to the said float, the said member having gyroscopic means connected to the said combined structure, the center of mass of the said combined structure being substantially at the same point as the center of buoyancy of the said float.

2. In a gyroscopic compass of the type in which the compass has a meridian seeking member which is supported by a float immersed in a body of liquid, said member and float forming a combined structure, means adapted to prevent any substantial lateral movement of said float in said fluid, the diameter of the surface of the said combined structure which may be in contact with the surface of said liquid, being less than the greatest diameter of said float.

3. In a gyroscopic compass having a meridian seeking member whose weight is substantially counterbalanced by the buoyancy of a float immersed in a body of liquid, the combination of a vessel containing liquid, a float located within the said vessel so that a buoyant effect is exerted thereon by the said liquid, a shaft secured to the said float, the said vessel having a mouth through which said shaft projects of smaller diameter than the body thereof, the level of the liquid being such that the top thereof extends above the float and into the said mouth.

4. In a gyroscopic compass having a meridian seeking member whose weight is substantially counterbalanced by the buoyancy of a float immersed in a body of liquid, the combination of a vessel containing liquid, a float located within the said vessel so that a buoyant effect is exerted thereon by the said liquid, a shaft secured to the said float, the said vessel having a mouth through which said shaft projects of smaller diameter than the body thereof, the level of the liquid being such that the top thereof extends above the float and into the said mouth, the portion of the shaft projecting into the said mouth being of smaller diameter than the main body of the said shaft which is connected to the float.

5. In a gyroscopic compass having a meridian seeking member having a float and whose weight is substantially counterbalanced by the buoyancy of said float immersed in a body of liquid, the combination of a vessel adapted to be filled with a liquid to exert a buoyant effect upon the float located therein, the said float having a shaft connected thereto and projecting through the said vessel, the said vessel having a mouth through which said shaft projects which is not greater than three-quarters of an inch in diameter and into which the said liquid extends.

6. In a gyroscopic compass having a meridian seeking member having a float and whose weight is substantially counterbalanced by the buoyancy of said float immersed in a body of liquid, the combination of a vessel adapted to contain a liquid so as to exert a buoyant effect upon the float located within the said vessel, a float located within the said vessel and having a shaft connected thereto, the said vessel having a mouth through which said shaft projects above the said float into which the said liquid extends, said mouth being of smaller diameter than the said float.

7. In a gyroscopic compass having a meridian seeking member having a float and whose weight is substantially counterbalanced by the buoyancy of said float immersed in a body of liquid, the combination of a pedestal for the said compass, a container for the said liquid, a series of rings adapted to connect the said container and said pedestal so that the said container can be inclined with respect to the said pedestal in three directions perpendicular to each other, the said container being connected to the said pedestal by means of a Cardan suspension, the said container having a revoluble shaft secured thereto so that said shaft can have substantially no tilting movement with respect to the said container, and a float connected to the said shaft and completely immersed in the liquid located in the said container, whereby the said container and shaft maintain the same relative position at all times.

In testimony whereof I hereunto affix my signature.

ARTHUR PATTISON DAVIS.